United States Patent
McWilliams

(10) Patent No.: US 6,612,643 B1
(45) Date of Patent: Sep. 2, 2003

(54) BI-METALLIC TRAILER RAIL

(75) Inventor: Cliff McWilliams, Katy, TX (US)

(73) Assignee: Vantage Dump Trailers, Inc., Katy, TX (US)

( * ) Notice: Subject to any disclaimer, the term of this patent is extended or adjusted under 35 U.S.C. 154(b) by 204 days.

(21) Appl. No.: 09/929,451

(22) Filed: Aug. 14, 2001

(51) Int. Cl.[7] .................................................. B60P 1/04
(52) U.S. Cl. ...................................... 296/181; 296/184
(58) Field of Search .............................. 296/181, 183, 296/184, 188; 298/17 R

(56) References Cited

U.S. PATENT DOCUMENTS

| | | | |
|---|---|---|---|
| 3,480,321 A | 11/1969 | Brandt et al. | 296/28 |
| 3,729,230 A | 4/1973 | Tomlinson, Jr. et al. | 298/7 |
| 4,883,321 A | 11/1989 | Voigt | 298/17.7 |
| 5,005,893 A | 4/1991 | McCrary | 296/21 |
| 5,090,773 A | 2/1992 | Guillaume | 298/17 |
| 5,454,620 A | * 10/1995 | Hill et al. | 296/184 |
| 5,460,431 A | 10/1995 | McWilliams | 298/22 |

* cited by examiner

Primary Examiner—Joseph D. Pape
(74) Attorney, Agent, or Firm—Head, Johnson & Kachigian

(57) ABSTRACT

A rail for a trailer comprising an insert and rail body with a plurality of sides and an elongated slot, the slot being contained in one of the sides of the rail body and comprising a first and second surface, a side connecting the first and second surfaces and a lip attached to the second surface and opposing the side. The insert includes an elongated body sized to substantially fill and be contained within the slot, the rail body being made of a first material and the insert being made of a second material, the second material having a higher yield strength and higher tensile strength than the first material.

9 Claims, 6 Drawing Sheets

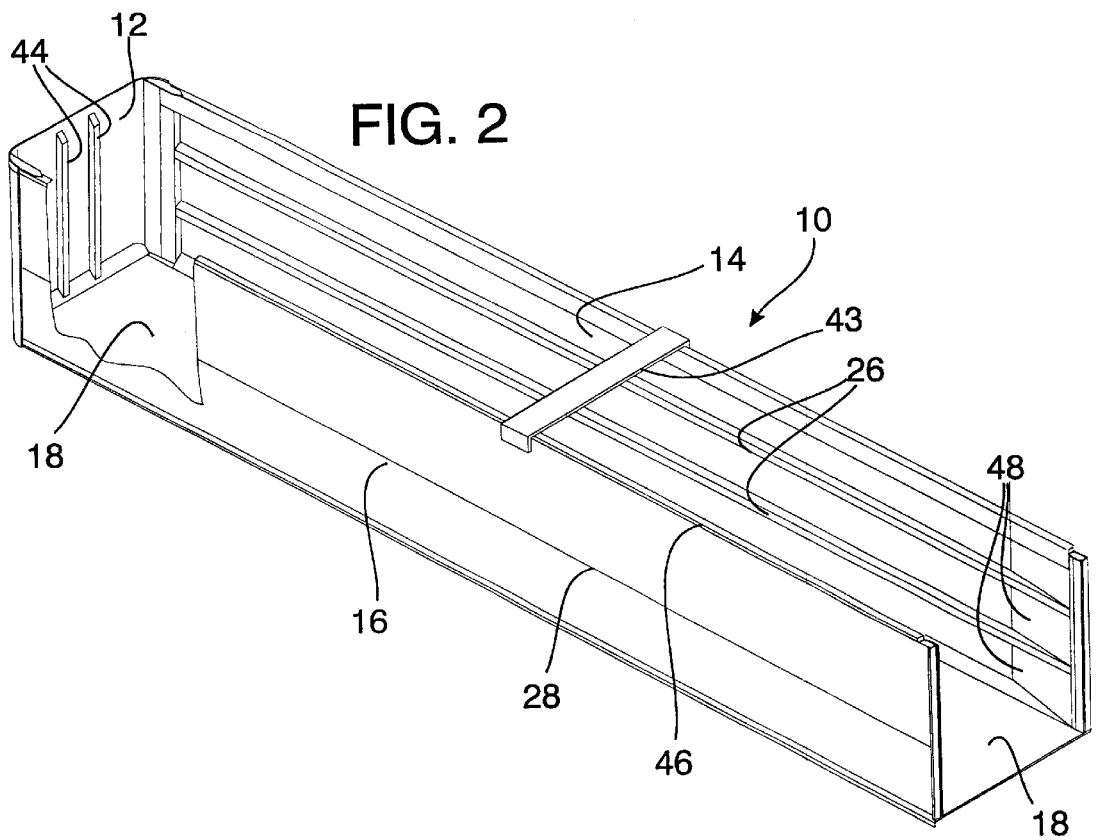
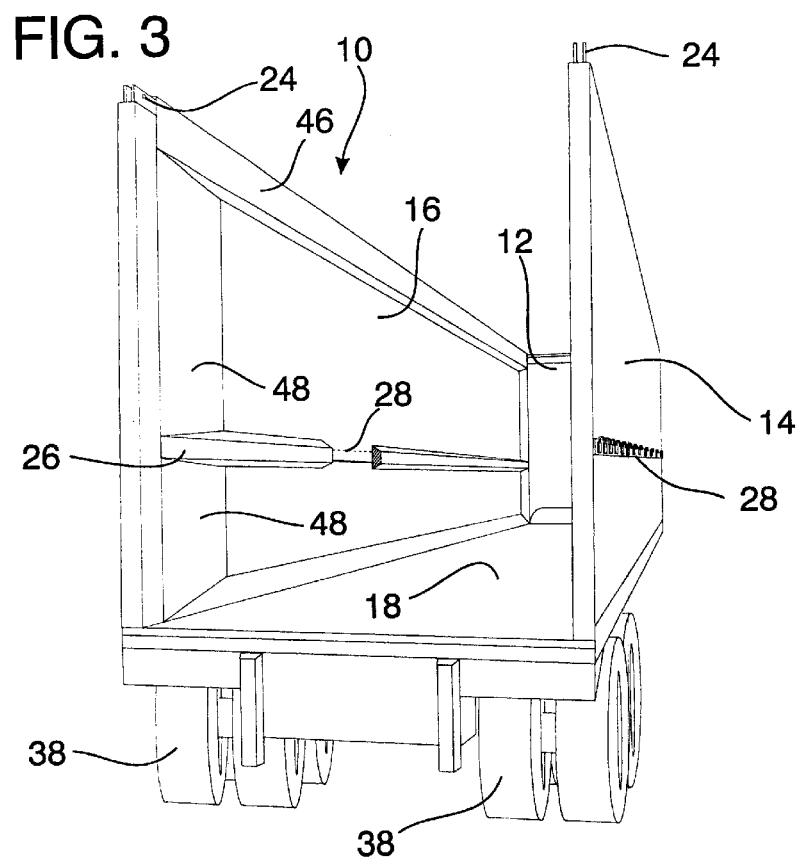

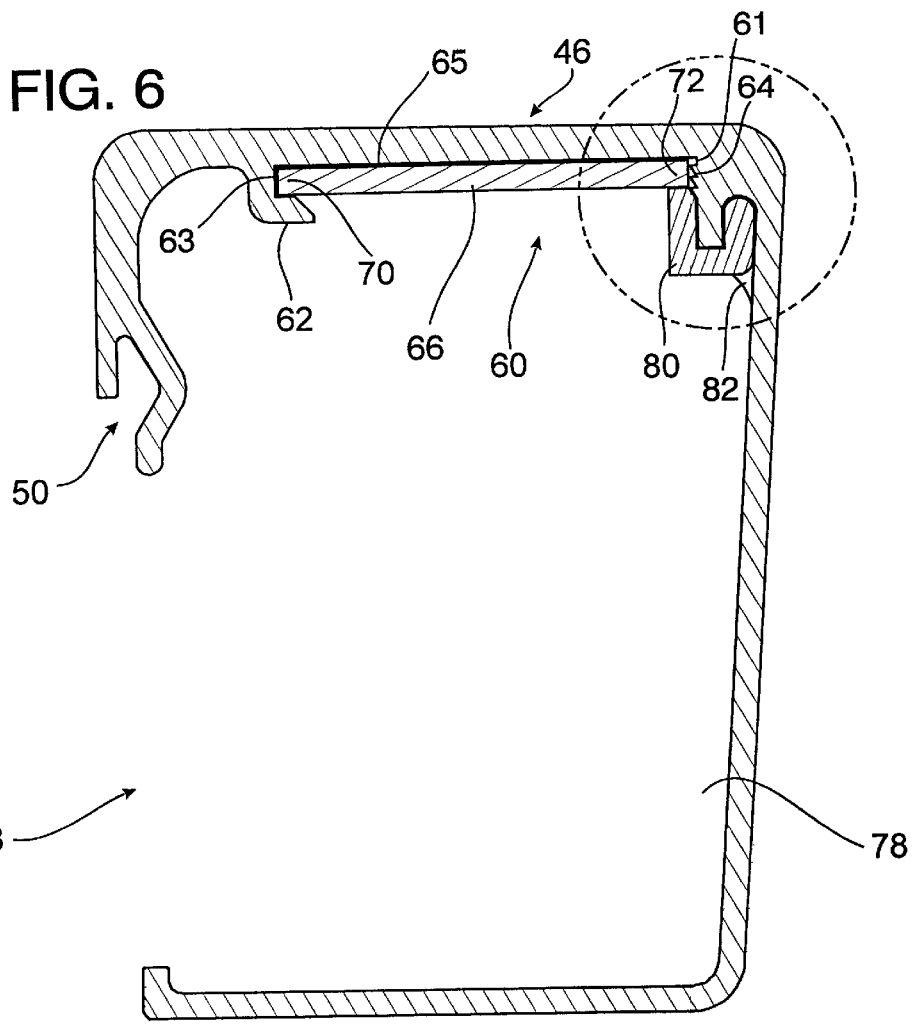
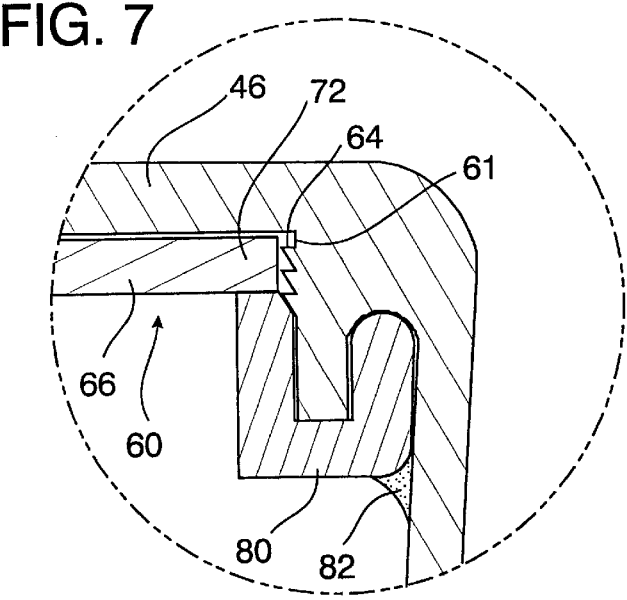

BI-METALLIC TRAILER RAIL

BACKGROUND OF THE INVENTION

1. Field of the Invention

The present invention is directed towards a structural side rail for a dumping vehicle and a method to manufacture the rail. The present invention can be used on a tipper trailer, dump trailer or any other type of trailer or cargo box mounted on the back of a truck which needs a lightweight and strong structural member.

2. Prior Art

Tipper trailers are used to transport cargo, such as garbage or other materials, behind trucks or other vehicles. The cargo is dumped from a tipper trailer by moving the trailer onto a platform, detaching the truck, and then tilting the platform so that the front end of the tipper trailer is raised above the rear end, and the cargo slides out the rear end by the force of gravity. Unlike a dump trailer, the platform provides the tilting force to raise the trailer between the loading and unloading positions, whereas a dump trailer has a mechanism built into the trailer which can tip the trailer.

The sidewalls of tipper trailers are typically constructed from sheets of aluminum that are welded together along their sides so that a series of vertical seams are produced. The vertical seams provide wear points where a weakness can occur as the cargo slides over the sidewalls during dumping of a tipper trailer.

In the prior art, vertical rails have been placed over the seams to protect the seams from wear and also to provide support for the sidewalls. If the vertical rails are placed in the interior of a tipper trailer, they interfere with the discharge of the cargo during dumping. Typically, therefore, vertical rails are placed on the exterior of a tipper trailer so that the interior is smooth. Placing rails on the exterior of a tipper trailer results in a reduction of the interior volume available for cargo, since the overall width of the tipper trailer is limited by traffic laws. In addition, numerous vertical seams and vertical rails are required in the construction of a tipper trailer. Because the lengths of the sidewalls are typically many times their height, and the expense of welding numerous sheets of metal together and welding numerous rails onto the sidewalls significantly increases the cost of manufacturing a tipper trailer using vertical rails.

Also, in the prior art, the floor of a tipper trailer is constructed so that it is at a minimum height in order to accommodate the hitch (or fifth wheel) to the truck or other vehicle used to pull the tipper trailer. The floor is typically parallel to the ground throughout. The overall height, width, and length of the tipper trailer are all limited by traffic laws. Therefore, the height of the floor affects the interior volume and capacity of the tipper trailer for cargo.

Tipper trailers with horizontal ribs or rails were introduced as an improvement on tipper trailers constructed with vertical ribs.

In an effort to maximize the internal volume of the tipper trailer while minimizing the weight, it is possible to use a set of internal horizontal rails which add rigidity to the sidewalls of the trailer while providing a wear and tear resistance structure covering the seam and part of the sidewall of the tipper trailer. This also facilitates sliding of the cargo from the interior during dumping. One drawback of using the horizontal rails is that due to their long span, they have a tendency to flex outward when the tipper trailer is loaded. It is possible for the sidewalls of a tipper trailer constructed using horizontal rails to flex outward up to eleven inches when fully loaded. The horizontal rails were typically made from a single piece of extruded aluminum. Thus the horizontal rails must be made of an aluminum extrusion with very thick sidewalls. A center crossover brace can also be attached to the top center of the sidewalls in order to minimize the deflection of the sidewalls when the tipper trailer is loaded. However, the center crossover brace interfere with top loading the tipper trailer.

It is an object of the present invention is to reduce the thickness of the sidewalls of the horizontal rails while increasing the strength and rigidity of these rails.

It is a further object and purpose of the present invention to minimize the amount of weight of the horizontal rails.

It is yet a further object and purpose of the present invention to maximize the strength and rigidity of the tipper trailer side rails.

It is yet a further object and purpose of this invention to create a horizontal rail for a trailer which is sturdy enough that a center crossover brace is not required.

Other objects and further scope of the applicability of the present invention will become apparent from the detailed description to follow, taken in conjunction with the accompanying drawings wherein like parts are designated by like reference numerals.

BRIEF SUMMARY OF THE INVENTION

The present invention is an improved rail for a tipper trailer. Tipper trailers are primarily used for transporting and dumping of materials such as garbage. The rail is constructed of an extruded piece of metal typically aluminum, although other metals or materials could be used. The rail has a slot running the length of it. A second piece, the insert, made of stronger material such as AR400 or 7005 aluminum, although other metals or materials could be used, is then inserted in the slot. The insert does not need to run the entire length of the rail but should run a substantial portion of the length of the rail and should be located in the center portion of the rail. The insert can be held in place by a number of apparatuses including a second piece of extruded aluminum used as a clip or a weld or combination of the two. If the extruded rail is aluminum and the insert is steel, the insert can be coated with a powder coating or galvanized in order to prevent corrosion inherent when steel and aluminum are in direct contact with each other. Under certain circumstances the slot can be coated with an adhesive prior to the insert being placed in the slot. The adhesive prevents the insert from coming in direct contact with the slot thus eliminating the need to coat the insert. The adhesive also provides a sufficient bond between the slot and the insert thus eliminating the need to use a retaining body such as a rod, clip or block welded to the interior of the rail, clip and/or weld to hold the insert in place. Also once the insert is in place the interior of the rail can be filled with a urethane foam to prevent air from coming in contact with the steel and aluminum interface in order to further prevent the possibility of corrosion. The rail is then welded into place, thus, sealing the interior of the rail from the atmosphere.

BRIEF DESCRIPTION OF THE DRAWINGS

FIG. 2 is a cut-away perspective drawing of a tipper trailer constructed with horizontal internal ribs and a center brace without using the present invention.

FIG. 3 is a perspective drawing of a tipper trailer with horizontal rails using the present invention.

FIG. 6 is a cross-sectional view of a top horizontal rail incorporating the present invention wherein the insert is held in place by an extruded metal clip and a weld.

FIG. 7 is a close up of the clip and weld holding the insert in FIG. 6.

DETAILED DESCRIPTION OF THE PREFERRED EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
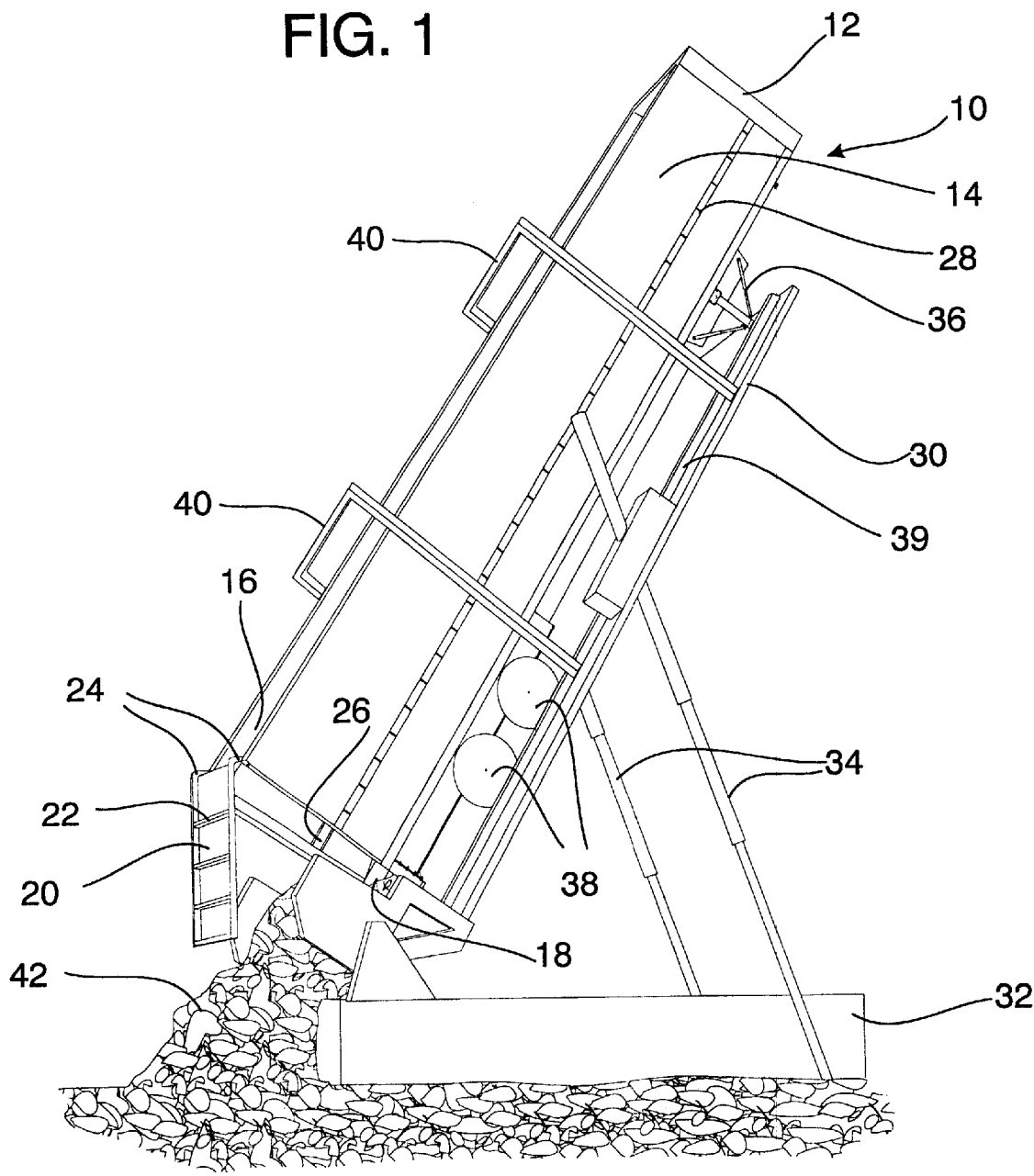
FIG. 1 is a perspective view of a tipper trailer mounted on a platform and tilted so that the cargo is emptied from it.

FIG. 1 is a perspective view of a tipper trailer 10 with horizontal rails on a tipping platform 30 being emptied. The tipper trailer 10 has a front end 12, a right side wall 14, a left side wall 16, a floor 18, and a rear tailgate 20 with external ribs 22 mounted on hinges 24. One of the intermediate horizontal ribs 26 can also be seen. It also has a seam 28 running horizontally the length of the tipper trailer 10 on both sides, the right side wall 14 and the left side wall 16. This is where the sheets of aluminum are joined together to form the right side wall 14. The corresponding seam 28 found on the left side wall 16 cannot be seen in this figure. The tipper platform 30 is pivotally connected to the base 32. It is tilted by the hydraulic telescopic cylinders 34 mounted to the platform 30 and base 32.

While the tipper trailer 10 is sitting on the platform 30 it is supported by the front supports 36 and a plurality of wheels 38. The tipper trailer 10 is held on the platform 30 by a pair of floor rails 39 which run the length of the platform 30 and are found on either side of the tires 20. There are also one or more braces 40 mounted on the platform 30 which helps retain the tipper trailer 10 on the platform 30 while it is being tilted.

Once the tipper trailer 10 is in the tilted position, the cargo 42 slides out the rear tailgate 20 and into a pile or pit where it is then moved for further processing. Various types of tipper platforms are known and the platform 30 does not form a part of the invention.

FIG. 2 is a cut-away perspective drawing of a tipper trailer 10 constructed without using the present invention. The tipper trailer 10 has a right and left side wall 14 and 16, a front end 12, a floor 18 and a center crossover brace 43. The right and left side wall 14 and 16 both have two intermediate horizontal rails 26 and a top horizontal rail 46. The center crossover brace 43 is attached to the top horizontal rails 46 to add rigidity to the right and left side walls 14 and 16 and to prevent them from flexing outward when the tipper trailer 10 is fully loaded. The front end 12 of the tipper trailer 10 has two vertical rails 44 to provide added strength for the front end 12. Although it is not shown in FIG. 2, the four intermediate rails 26 and two top rails 46 are each made from a single piece of extruded aluminum.

Both the right and left side wall 14 and 16 have a plurality of shims or transition plates 48 located near the rear of the tipper trailer 10. The shims 48 help funnel the cargo 42 out the rear of the tipper trailer 10 when it is being emptied.

FIG. 3 is a perspective drawing of a tipper trailer 10 with the intermediate and top horizontal rails 26 and 46 using the teachings of the present invention. As can be seen in the drawing, due to the increased strength of the improved intermediate and top horizontal rails 26 and 46, only a top horizontal rib 46 and an intermediate horizontal rib 26 are required. Also due to the increased strength of the improved rails, a center crossover brace 43 as shown in FIG. 2 is not required to prevent the left and right sidewalls 14 and 16 from bowing outward when the tipper trailer 10 is fully loaded. A pair of shims 48 are located on the left side wall 16 above and below the intermediate horizontal rails 26. The shims 48 help funnel the cargo out the rear of the tipper trailer 10 when it is tipped. The right side Wall 14 has a corresponding pair of shims 48 which are not shown in FIG. 3. The seam 28 is shown running down both the right side wall 14 and the left side wall 16. The intermediate horizontal rail 26 is located to cover the seam 28 on the inside of the tipper trailer 10 in order to avoid wear on the seam 28.

Figure 4:
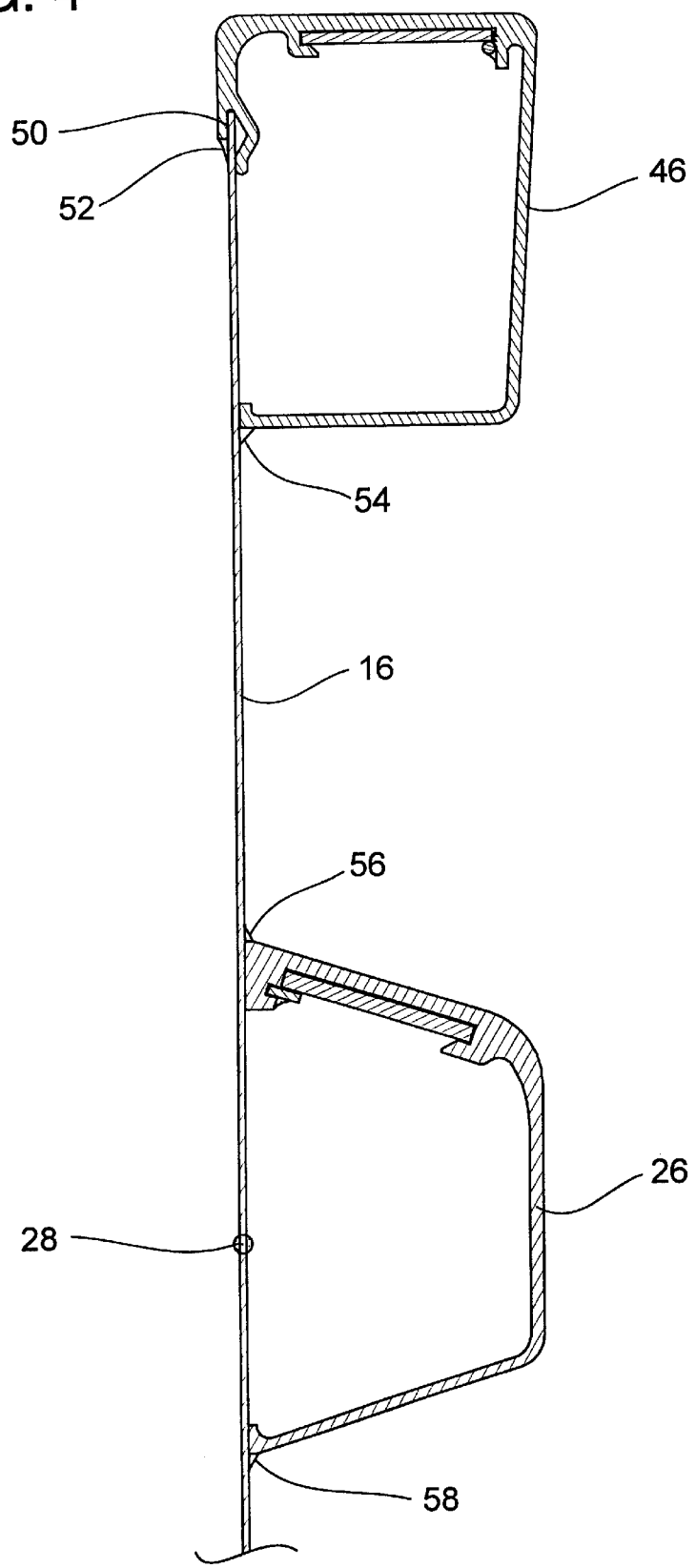
FIG. 4 is a cross-sectional view of FIG. 3 showing the construction of the top horizontal rail and intermediate horizontal rail along with the left side wall.

FIG. 4 is a cross-sectional end view of the left side wall 16 with its top horizontal rail 46 and the intermediate horizontal rail 26. The left side wall 16 is constructed of two sheets of metal, typically aluminum, which are connected together with a weld at the seam 28. It should be noted that other materials could be used for the side wall other than aluminum. In its preferred embodiment, the top horizontal rail 46 is initially mounted onto the left side wall 16 using a clip portion 50 of the top horizontal rail 46. Once the top horizontal rail 46 is in place, it is secured in place by welds 52 and 54. The intermediate horizontal rail 26 is placed over the seam 28 and welded into place by welds 56 and 58.

Figure 5:
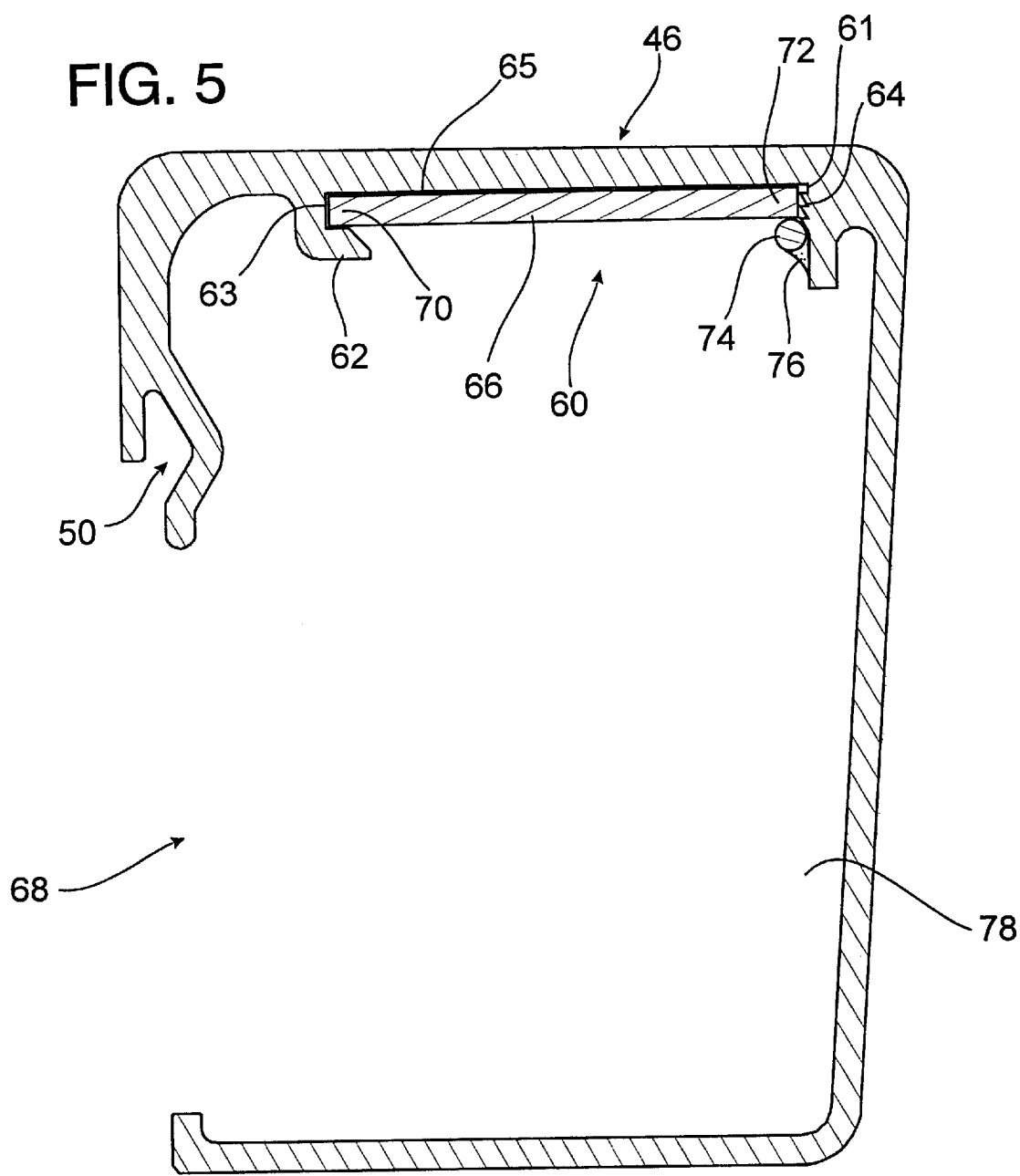
FIG. 5 is a cross-sectional view of a top horizontal rail incorporating the present invention wherein the insert is held in place by a rod and a weld.

FIG. 5 is a cross-sectional close up view of the top horizontal rail 46. The top horizontal rail 46 has a slot 60. The slot 60 has a first surface 61, a second surface 63, a third surface 65 connecting the first and second surfaces 61 and 63, a lip 62 running along the second surface 63 and teeth 64 running along the first surface 61. The insert 66 is made of a material with a higher tensile strength and a higher yield strength than the material of the top horizontal rail 46. If the material of the top horizontal rail 46 is zaluminum and the insert 66 is made of a steel, the insert 66 can be coated with a powder coating or galvanized in order to prevent direct contact between the aluminum and the steel. The coating will help eliminate the possibility of corrosion inherent when aluminum and steel are in direct contact. Other possible preferred materials for the insert 66 are higher strength aluminum alloy, polycarbon or higher strength steel alloy.

In order to assemble the top horizontal rail 46 and the insert 66, the insert 66 is placed in the slot 60 prior to the top horizontal rail 46 being mounted on the left side wall 16. The insert 66 is placed in the slot 60 by inserting the insert 66 through the opening 68 with the leading edge 70 of the insert 66 going in first. The insert is then rotated so that the leading edge 70 is inserted into the slot 60 and behind the lip 62. The insert is then rotated further so that the trailing edge 72 is brought into contact with the teeth 64. The slot 60 and the insert 66 are sized so that there is an interference fit between the trailing edge 72 and the teeth 64. When the leading edge 72 comes into initial contact with the teeth 64, force is applied along the trailing edge 72 to force the trailing edge 72 into the slot 60. This creates the interference fit between the trailing edge 72 and the teeth 64. Once the trailing edge 72 is in place, a rod 74 is placed next to the trailing edge 72 and the teeth 64. The rod 74 is held in place by the weld 76. It should be noted that the rod 74 is made of a material that is compatible for welding to the material which the top horizontal rail 46 is constructed of. Once the insert 66 is in place, the interior 78 can be filled with a urethane foam to reduce the amount of oxygen in the interior 78 and to further reduce the possibility of corrosion between the top horizontal rail 46 and the insert 66 in the event they are made of incompatible materials, such as aluminum and steel respectively. The assembled top horizontal rail 46 is then clipped onto the left side wall 16 and welded into place. It should be noted that the top horizontal rail on the right side wall is constructed and assembled in a similar manner.

FIG. 6 is a cross-sectional end view of a top horizontal rail 46 as shown in FIG. 5, however, the insert 66 found in FIG. 6 is held in place by a clip 80 and a weld 82.

FIG. 7 shows a close up view of the clip 80 shown in FIG. 6. The clip 80 and the weld 82 can be used in lieu of the rod 74 and weld 76 as shown in FIG. 5.

Figure 8:
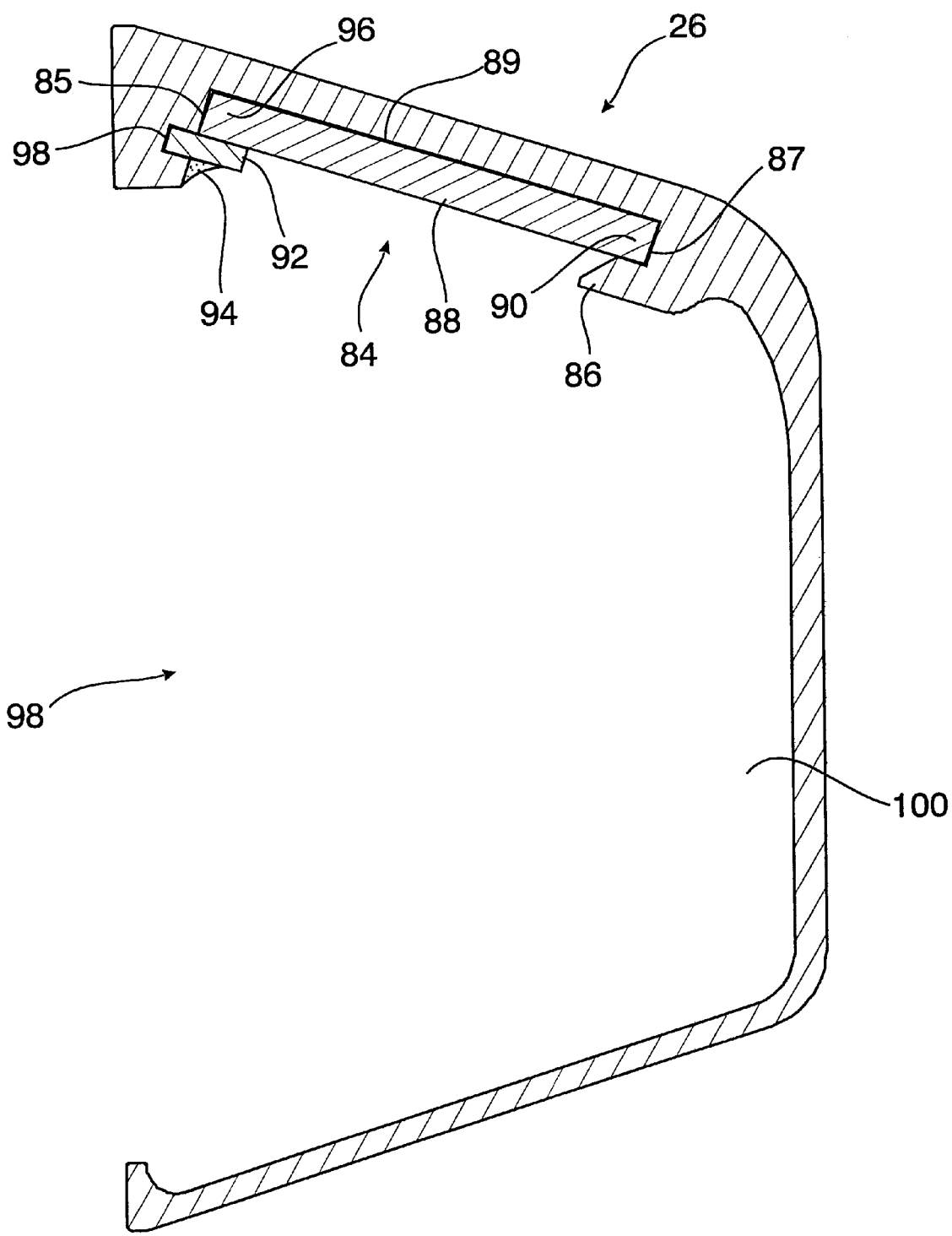
FIG. 8 is a cross-sectional view of an intermediate horizontal rail with the insert being held in place by a bar in a weld.

FIG. 8 is a cross-sectional end view of the intermediate horizontal rib 46 shown in FIG. 4. The intermediate horizontal rail 26 has an slot 84 with a first surface 85, a second surface 87, and a third surface 89 connecting the first and second surfaces 85 and 87. The slot 84 has a lip 86 running along the second surface 87. The slot 84 has a groove 98 running along the first surface 85. The insert 88 is held in the slot 84 by the lip 86 running along the leading edge 90 of the insert 88 and the block 92 and weld 94 running along the trailing edge 96 of the insert 88. As on the top horizontal rail 46, the insert 88 of the intermediate horizontal rail 26 is typically made of a material with a higher tensile strength and higher yield strength than the material of the intermediate horizontal rib 26. In the event that the intermediate horizontal rib 26 and insert 88 are made of incompatible materials, such as aluminum and steel respectively, the insert 88 can be coated with a powdered coating or galvanized in order to minimize the possibility of corrosion inherent with aluminum and steel in direct contact with one another.

In order to assemble the insert 88 and intermediate horizontal rib 26, the leading edge 90 of the insert 88 is passed through the open side 98 of the intermediate horizontal rib 26. The leading edge 90 is then placed in the slot 84 behind the lip 86. The trailing edge 96 is then rotated until it is in the slot 84. Force can be applied as necessary along the trailing edge 96 of the insert 88 in order to force it into the slot 84. Once the insert 88 is in the slot 84 the block 92 is inserted in the groove 98 running along the trailing edge 96 of the insert 88. The block 92 is then held in place by the weld 94. The interior 100 of the intermediate horizontal rib 26 can be filled with urethane foam in order to minimize the presence of oxygen within the intermediate horizontal rib 26 in an effort to minimize the possibility of corrosion. The fully assembled intermediate horizontal rib 26 is then welded into place on the left side wall 16. It should be noted that the intermediate horizontal rib 26 found on the right side wall 14 would be constructed in a similar manner.

In an alternative embodiment of the present invention, under certain circumstances the slot 60 of the top horizontal rail 46 shown in FIG. 5 and the slot 84 of the intermediate horizontal rail 26 shown in FIG. 8 can be coated with any one of a number of adhesive commercially available prior to the insert 66 or 88 being place into the slot 60 or 84. The adhesive prevents the insert 66 or 88 from coming into direct contact with the slot 60 or 84 thus eliminating the need to coat the insert 66 or 88. The adhesive also provides a sufficient bond between the slot 60 or 84 and the insert 66 or 88 thus eliminating the need to use a retaining body such as the rod 74, the clip 80 or the block 92 or having to weld the retaining bodies into place with their related welds 76, 82 and 94 respectively.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A rail for a trailer comprising:
   a rail body with a plurality of sides and an elongated slot, the slot being contained in one of the sides of the rail body,
   the slot comprising a first surface, a second surface, a third surface connecting the first and second surfaces, and a lip attached to the second surface and opposing the third surface; and
   an insert comprising an elongated body sized to substantially fill and be contained within the slot, the rail body being made of a first material and the insert being made of a second material, the second material having a higher yield strength and higher tensile strength than the first material.

2. A rail for a trailer as claimed in claim 1, wherein the first material is aluminum.

3. A rail for a trailer as claimed in claim 1, wherein the second material is chosen from the group consisting of aluminum alloy, polycarbon and alloy steel.

4. A rail for a trailer as claimed in claim 1, including teeth running along the second surface of the slot.

5. A rail for a trailer as claimed in claim 1, wherein there is an adhesive between the insert and the slot.

6. A rail for a trailer as claimed in claim 1, wherein there is a retaining body made of material compatible for welding to the first material of the rail body wherein the retaining body is welded to the rail body adjacent to the first surface of the slot.

7. A rail for a trailer as claimed in claim 1, wherein there is a coating covering the insert.

8. A rail for a trailer as claimed in claim 7, wherein the coating is a powdered coating.

9. A rail for a trailer as claimed in claim 7, wherein the coating is galvanizing.

* * * * *